(12) United States Patent
Wu et al.

(10) Patent No.: US 12,074,786 B2
(45) Date of Patent: Aug. 27, 2024

(54) PACKET ADVERTISEMENT METHOD AND RELATED APPARATUS

(71) Applicant: Huawei Technologies Co., Ltd., Shenzhen (CN)

(72) Inventors: Zhiwen Wu, Beijing (CN); Haibo Wang, Beijing (CN); Lili Wang, Beijing (CN); Lei Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/069,587

(22) Filed: Dec. 21, 2022

(65) Prior Publication Data

US 2023/0117035 A1 Apr. 20, 2023

Related U.S. Application Data

(63) Continuation of application No. PCT/CN2021/101701, filed on Jun. 23, 2021.

(30) Foreign Application Priority Data

Jun. 23, 2020 (CN) .......................... 202010584045.3

(51) Int. Cl.
*H04L 45/28* (2022.01)
*H04L 45/00* (2022.01)
*H04L 45/748* (2022.01)

(52) U.S. Cl.
CPC ............ *H04L 45/28* (2013.01); *H04L 45/566* (2013.01); *H04L 45/748* (2013.01)

(58) Field of Classification Search
CPC ..... H04L 45/28; H04L 45/566; H04L 45/748; H04L 45/70
See application file for complete search history.

(56) References Cited

U.S. PATENT DOCUMENTS 8,370,474 B1 2/2013 Reeves et al.
10,893,022 B1 * 1/2021 Li .......................... H04L 45/748
(Continued)

FOREIGN PATENT DOCUMENTS

CN 101075869 A 11/2007
CN 101594305 A 12/2009
(Continued)

OTHER PUBLICATIONS

Liu Yingguo, Design and Implementation of Robustness Testing of Inter-domain Routing Protocol BGP-4, Mar. 2005, 11 pages.
(Continued)

*Primary Examiner* — Michael Won
(74) *Attorney, Agent, or Firm* — Conley Rose, P.C.

(57) ABSTRACT

A packet advertisement method is implemented by a first network device. The packet advertisement method includes the first network device sending a first packet to a second network device advertising a route to the second network device. The first network device receives a second packet from the second network device in response to a first packet error. The second packet includes first indication information indicating the first packet error. The first network device determines, based on the first indication information, a route advertisement policy of a feature included in the first packet.

20 Claims, 6 Drawing Sheets

(56) References Cited

U.S. PATENT DOCUMENTS

| | | | | |
|---|---|---|---|---|
| 2006/0291475 | A1* | 12/2006 | Cohen | H04L 47/31 |
| | | | | 714/751 |
| 2011/0142051 | A1* | 6/2011 | Bhatt | H04L 41/0853 |
| | | | | 370/392 |
| 2013/0208583 | A1* | 8/2013 | Guo | H04L 45/28 |
| | | | | 370/225 |
| 2015/0095481 | A1* | 4/2015 | Ohnishi | H04L 45/14 |
| | | | | 709/223 |
| 2015/0124711 | A1* | 5/2015 | Krinsky | H04W 8/22 |
| | | | | 370/329 |
| 2017/0005923 | A1* | 1/2017 | Babakian | G06F 9/45558 |
| 2018/0069782 | A1* | 3/2018 | Wosik | H04L 61/2532 |
| 2018/0254921 | A1 | 9/2018 | Xu et al. | |
| 2021/0194999 | A1* | 6/2021 | Du | H04L 45/04 |
| 2021/0250295 | A1 | 8/2021 | Gu et al. | |
| 2021/0258256 | A1 | 8/2021 | Wang et al. | |
| 2023/0021278 | A1* | 1/2023 | Filsfils | H04L 45/28 |
| 2023/0032924 | A1* | 2/2023 | Wells | H04L 47/24 |

FOREIGN PATENT DOCUMENTS

| | | |
|---|---|---|
| CN | 101841453 A | 9/2010 |
| CN | 102143077 A | 8/2011 |
| CN | 102202004 B | 1/2014 |
| CN | 105790885 A | 7/2016 |
| CN | 108353022 A | 7/2018 |
| CN | 110619083 A | 12/2019 |
| CN | 110912907 A | 3/2020 |
| CN | 110932970 A | 3/2020 |
| CN | 111147371 A | 5/2020 |
| CN | 111147380 A | 5/2020 |
| JP | 2018137637 A | 8/2018 |
| KR | 20150050447 A | 5/2015 |
| WO | 2009132530 A1 | 11/2009 |
| WO | 2013189414 A2 | 12/2013 |
| WO | 2016101604 A1 | 6/2016 |

OTHER PUBLICATIONS

Rekhter, Y., T. Li, and S. Hares. "A Border Gateway Protocol 4 (BGP-4)," RFC 4271, Jan. 2006, 104 pages.

S. Previdi et al., "Advertising Advertising Segment Routing Policies in BGP," draft-ietf-idr-segment-routing-te-policy-09, Network Working Group, Internet-Draft, May 28, 2020, 39 pages.

* cited by examiner

PACKET ADVERTISEMENT METHOD AND RELATED APPARATUS

CROSS-REFERENCE TO RELATED APPLICATIONS

This application is a continuation of International Patent Application No. PCT/CN2021/101701, filed on Jun. 23, 2021, which claims priority to Chinese Patent Application No. 202010584045.3, filed on Jun. 23, 2020. The disclosures of the aforementioned applications are hereby incorporated by reference in their entireties.

TECHNICAL FIELD

Embodiments of the present disclosure relate to the field of communication technologies, and in particular, to a packet advertisement method, an apparatus, and a system.

BACKGROUND

With the development of modern networks, network communication has been widely used in people's life. People use devices such as a mobile phone, a computer, and a tablet to connect to network devices such as a router and an access point and access a network. Therefore, a stable connection between network devices is quite important.

In some cases, for example, if a network device sends an incorrect Border Gateway Protocol (BGP) packet, a BGP session between the two network devices is temporarily disconnected, and is reconnected after a period of time.

However, if the network device still sends the incorrect packet after being reconnected, the two network devices are disconnected and reconnected again. As a result, the two network devices are repeatedly disconnected and reconnected, and flapping occurs repeatedly.

SUMMARY

Embodiments of the present disclosure provide a packet advertisement method and a related apparatus to resolve a technical problem that, in BGP, two network devices are repeatedly disconnected and reconnected and flap repeatedly when an incorrect packet is transmitted between the two network devices.

According to a first aspect, an embodiment of the present disclosure provides a packet advertisement method including a first network device sends a first packet to a second network device, where the first packet is used to advertise a route to the second network device; the first network device receives a second packet from the second network device in response to a first packet error, where the second packet includes first indication information, and the first indication information indicates the first packet error; and the first network device determines, based on the first indication information, a route advertisement policy of a first feature included in the first packet. In embodiments of the present disclosure, the first network device verifies, based on the first indication information, the sent first packet error to determine a correct route advertisement policy and avoid sending an incorrect packet again. This resolves a technical problem that network devices are repeatedly disconnected and reconnected when an incorrect packet is transmitted between the network devices.

With reference to the first aspect, in an implementation of this embodiment of the present disclosure, the first feature includes a route prefix, the second packet includes the route prefix, and the route advertisement policy includes a route corresponding to the route prefix that is not advertised. If the first network device does not advertise the route corresponding to the route prefix, a case of sending an incorrect first packet to the second network device again can be avoided. This resolves the technical problem that network devices are repeatedly disconnected and reconnected when an incorrect packet is transmitted between the network devices.

With reference to the first aspect, in an implementation of this embodiment of the present disclosure, the first feature includes a route prefix and a specified attribute, the second packet includes the route prefix and the specified attribute, and the route advertisement policy includes the specified attribute is not carried when the route prefix is advertised. If the first network device does not include the specified attribute when advertising the route prefix, a case of sending an incorrect specified attribute can be avoided, so that a case of sending an incorrect first packet again can be avoided. This resolves the technical problem that network devices are repeatedly disconnected and reconnected when an incorrect packet is transmitted between the network devices.

With reference to the first aspect, in an implementation of this embodiment of the present disclosure, the first feature includes a specified attribute, and the route advertisement policy includes the specified attribute is not carried when a route advertisement packet is sent. If the first network device does not include the specified attribute when sending the route advertisement packet, a case of sending an incorrect specified attribute can be avoided, so that a case of sending an incorrect first packet again can be avoided. This resolves the technical problem that network devices are repeatedly disconnected and reconnected when an incorrect packet is transmitted between the network devices.

With reference to the first aspect, in an implementation of this embodiment of the present disclosure, the first packet includes a border gateway protocol BGP Update packet.

With reference to the first aspect, in an implementation of this embodiment of the present disclosure, the second packet includes a BGP Notification packet, and an error code field of the second packet carries the first indication information. An error code field of an existing Notification packet is used to carry the first indication information, so that changes to the conventional technology can be reduced, and availability of this solution can be improved.

With reference to the first aspect, in an implementation of this embodiment of the present disclosure, an error subcode field of the second packet further includes second indication information, and the second indication information indicates the route advertisement policy. An error code field and an error subcode field of an existing Notification packet is used to carry indication information, so that changes to the conventional technology can be reduced, and availability of this solution can be improved.

With reference to the first aspect, in an implementation of this embodiment of the present disclosure, the method further includes the first network device receives a first connection packet from the second network device, where the first connection packet includes capability indication information, and the capability indication information indicates that the second network device supports a route filtering enhancement capability. Before sending the first packet to the second network device, the first network device receives the first connection packet from the second network device and determines that the second network device supports a route filtering enhancement function. This can further improve reliability of a network, and avoid sending a packet that cannot be processed to the second network device.

According to a second aspect, an embodiment of the present disclosure provides a packet advertisement method including a second network device receives a first packet from a first network device; and the second network device sends, in response to verifying a first packet error, a second packet to the first network device, where the second packet carries first indication information, and the second packet indicates the first network device to determine, based on the first indication information, a route advertisement policy of a first feature included in the first packet.

With reference to the second aspect, in an implementation of this embodiment of the present disclosure, the method further includes the second network device sends a first connection packet to the first network device, where the first connection packet includes capability indication information, and the capability indication information indicates that the second network device supports a route filtering enhancement capability.

According to a third aspect, an embodiment of the present disclosure provides a network device including one or more processors, a memory, and a communication interface, where the memory is configured to store one or more programs, and the one or more processors are configured to run the one or more programs, so that the network device implements the method according to the first aspect or the second aspect.

According to a fourth aspect, an embodiment of the present disclosure provides a first communication apparatus including a sending module configured to send a first packet to a second communication apparatus, where the first packet is used to advertise a route to the second communication apparatus; a receiving module configured to receive a second packet from the second communication apparatus in response to a first packet error, where the second packet includes first indication information, and the first indication information indicates the first packet error; and a processing module configured to determine, based on the first indication information, a route advertisement policy of a first feature included in the first packet.

With reference to the fourth aspect, in an implementation of this embodiment of the present disclosure, the first feature includes a route prefix, the second packet includes the route prefix, and the route advertisement policy includes a route corresponding to the route prefix that is not advertised.

With reference to the fourth aspect, in an implementation of this embodiment of the present disclosure, the first feature includes a route prefix and a specified attribute, the second packet includes the route prefix and the specified attribute, and the route advertisement policy includes the specified attribute is not carried when the route prefix is advertised.

With reference to the fourth aspect, in an implementation of this embodiment of the present disclosure, the first feature includes a specified attribute, and the route advertisement policy includes the specified attribute is not carried when a route advertisement packet is sent.

With reference to the fourth aspect, in an implementation of this embodiment of the present disclosure, the first packet includes a border gateway protocol BGP Update packet.

With reference to the fourth aspect, in an implementation of this embodiment of the present disclosure, the second packet includes a BGP Notification packet, and an error code field of the second packet carries the first indication information.

With reference to the fourth aspect, in an implementation of this embodiment of the present disclosure, an error subcode field of the second packet further includes second indication information, and the second indication information indicates the route advertisement policy.

With reference to the fourth aspect, in an implementation of this embodiment of the present disclosure, the receiving module is further configured to receive a first connection packet from the second communication apparatus, where the first connection packet includes capability indication information, and the capability indication information indicates that the second communication apparatus supports a route filtering enhancement capability.

According to a fifth aspect, an embodiment of the present disclosure provides a second communication apparatus including a receiving module configured to receive a first packet from a first communication apparatus; and a sending module configured to send, in response to verifying a first packet error, a second packet to the first communication apparatus, where the second packet carries first indication information, and the second packet indicates the first communication apparatus to determine, based on the first indication information, a route advertisement policy of a first feature included in the first packet.

With reference to the fifth aspect, in an implementation of this embodiment of the present disclosure, the sending module is further configured to send a second connection packet to the first communication apparatus, where the second connection packet includes capability indication information, and the capability indication information indicates that the second communication apparatus supports a route filtering enhancement capability.

According to a sixth aspect, an embodiment of the present disclosure provides a chip, where the chip is configured to perform the packet advertisement method according to the first aspect or the second aspect.

According to a seventh aspect, an embodiment of the present disclosure provides a computer-readable storage medium, where the computer-readable storage medium stores instructions; and when the computer-readable storage medium is run on a computer, the computer performs the method according to the first aspect or the second aspect.

According to an eighth aspect, an embodiment of the present disclosure provides a network communication system including a first network device and a second network device, where the first network device includes the first communication apparatus according to the fourth aspect, and the second network device includes the second communication apparatus according to the fifth aspect.

DESCRIPTION OF EMBODIMENTS

Embodiments of the present disclosure provide a packet advertisement method and a related apparatus, to resolve a technical problem that, in BGP, two network devices are repeatedly disconnected and reconnected and flap repeatedly when an incorrect packet is transmitted between the two network devices.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. Moreover, the terms "include", "correspond to" and any other variant mean to cover non-exclusive inclusion. For example, a process, method, system, product, or device that includes a list of steps or units is not necessarily limited to those expressly listed steps or units, but may include other steps or units not expressly listed or inherent to such a process, method, system, product, or device.

In addition, in embodiments of the present disclosure, the word "example" or "for example" is used to represent giving an example, an illustration, or a description. Any embodiment or design scheme described as an "example" or "for example" in embodiments of the present disclosure should not be explained as being more preferred or having more advantages than another embodiment or design scheme. Exactly, use of the word "example", "for example", or the like is intended to present a related concept in a specific manner.

For clear and brief description of the following embodiments, a related technology is briefly described first.

Figure 1:
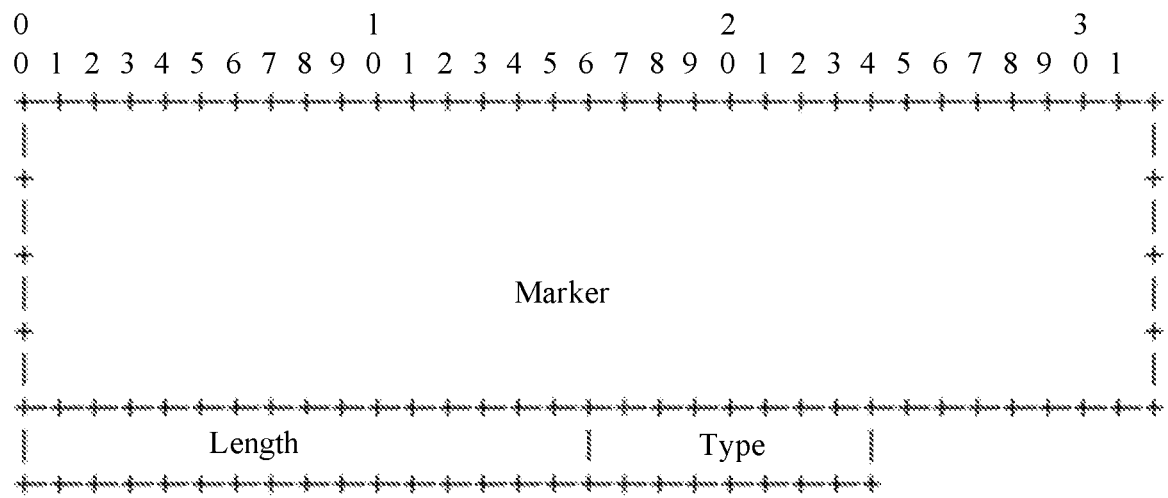
FIG. 1 is a schematic diagram of a format of a BGP packet header.

The BGP is an exterior gateway protocol used to control route transmission. FIG. 1 shows a format of a BGP packet header. Table 1 shows explanations of fields and definitions in the BGP packet header shown in FIG. 1 in this embodiment of the present disclosure.

TABLE 1

| Field | Definition |
| --- | --- |
| Marker | There are 16 bytes in total, and all bits are 1. |
| Length | Indicates total length of a BGP packet (including a packet header), in bytes. The length ranges from 19 bytes to 4096 bytes. |
| Type | Indicates a type of the BGP packet. A value of the type of the BGP packet ranges from 1 to 5, indicating an Open packet, an Update packet, a Notification packet, a Keepalive packet, and a Route-refresh packet, respectively. |

It can be learned with reference to FIG. 1 and Table 1 that, in a BGP packet header, values in different fields may represent different meanings. Therefore, a device can read corresponding information from different fields in the BGP packet header. For example, different values carried in a type field in the BGP packet header indicate different BGP packet types.

For example, when a value of the type field is 1, it indicates that the packet is an Open packet. An Open packet is a first packet sent after a Transmission Control Protocol (TCP) connection is established. It is used to negotiate a BGP neighbor parameter between BGP peers (also referred to as neighbors) and establish a connection between the peers.

Figure 2:
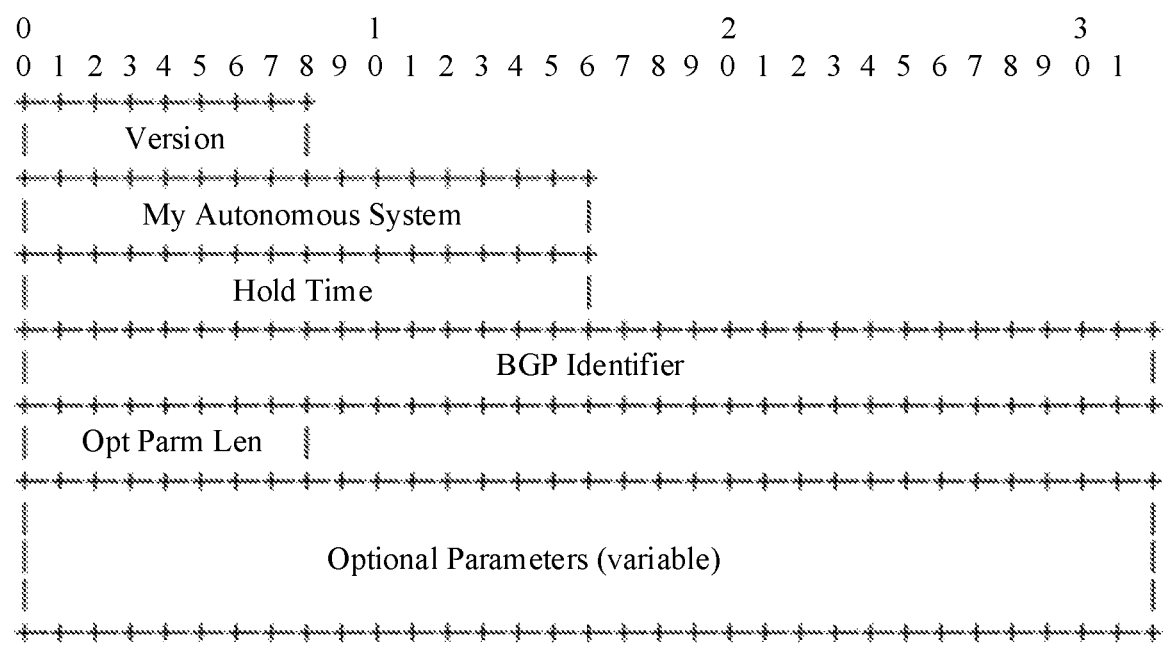
FIG. 2 is a schematic diagram of a packet format of an Open packet.

FIG. 2 is a schematic diagram of a packet format of an Open packet. Table 2 shows explanations of fields and definitions included in the Open packet in the schematic diagram of the packet format shown in FIG. 2 in this embodiment of the present disclosure.

TABLE 2

| Field | Definition |
| --- | --- |
| Version | Indicates a 1-byte unsigned integer that indicates a BGP version. A current BGP version is 4. |
| My Autonomous System (AS) | Indicates a 2-byte unsigned integer that indicates an AS number of a local BGP |
| Hold Time | Indicates a 2-byte unsigned integer that indicates BGP hold time expected by the local BGP (in seconds). After receiving an Open packet, a router needs to take a smaller value in locally configured hold time and hold time carried in the received Open packet as a value of a hold timer. |
| BGP Identifier | Indicates a 4-byte unsigned integer, used to distinguish between different routers when BGP sends a packet. |
| Opt Parm Len | Indicates a 1-byte unsigned integer, used to identify a total length of an optional parameter. If a value of the area is 0, no optional parameter exists therein. |
| Optional Parameters | Indicates that supported optional parameters are listed in a 3-tuple format of type-length-value (TLV). |

Figure 3:
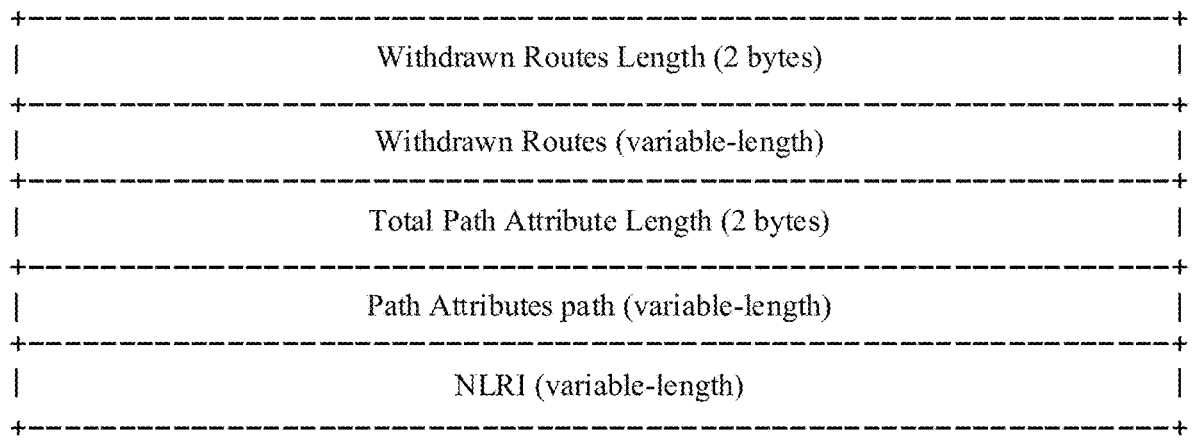
FIG. 3 is a schematic diagram of a packet format of an Update packet.

When a value of a type field in a BGP packet header is 2, the packet is an Update packet. An Update packet is used to exchange route information between two neighbors. The route information usually includes a route and a route attribute. The Update packets may be used to advertise one or more route information and withdraw unreachable route information. FIG. 3 is a schematic diagram of a packet format of an Update packet. Table 3 describes fields and definitions included in the format of the Update packet shown in FIG. 3.

TABLE 3

| Field | Definition |
| --- | --- |
| Withdrawn Routes Length | Indicates a 2-byte unsigned integer that indicates a total length of a "Withdrawn Routes" area. If a value is 0, no route needs tobe withdrawn in the UPDATE packet. |
| Withdrawn Routes | Indicates a variable-length area. Each route that needs to be withdrawn is stored in the area in a 2-tuple (length and prefix) format. |

TABLE 3-continued

| Field | Definition |
| --- | --- |
| Total Path Attribute Length | Indicates a 2-byte unsigned integer that indicates a total length of a "Path Attribute path" area. |
| Path Attributes | Indicates a variable-length area. The attribute needs to exist provided that there is an updated route in the UPDATE packet. Each path attribute includes a variable-length TLV 3-tuple. |
| Network layer reachability information (NLRI) | Indicates a variable-length area that includes a series of IP address prefixes. |

Figure 4:
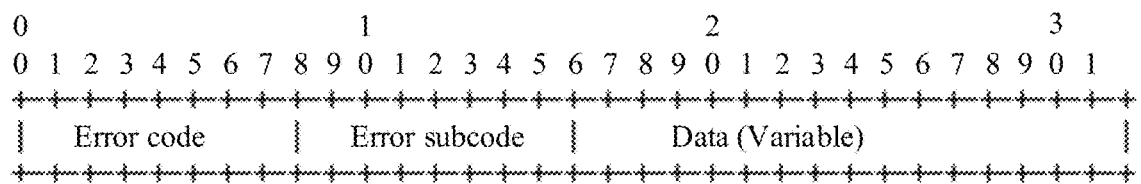
FIG. 4 is a schematic diagram of a packet format of a Notification packet.

After receiving an Update packet from a BGP neighbor, a network device verifies the Update packet. When detecting an error in the Update packet, the network device sends a Notification packet to the BGP neighbor, and then a BGP connection is interrupted. FIG. 4 is a schematic diagram of a format of a Notification packet. Table 4 describes fields and definitions of the Notification packet shown in FIG. 4.

TABLE 4

| Field | Definition |
| --- | --- |
| Error Code | Indicates an error code that is a 1-byte unsigned integer and that is used to identify a NOTIFICATION type. |
| Error SubCode | Indicates an error subcode that is a 1-byte unsigned integer and that is used to describe an error subtype in detail. |
| Data | Indicates a variable-length area, used to describe a detailed reason for sending "NOTIFICATION". Specific content of the area depends on types of the error code and the error subcode. |

Table 5 is an example of meanings of error codes and error subcodes that have been defined in a related technology. For example, if a Notification packet is FF FF FF FF FF FF FF FF FF FF FF FF FF FF FF FF 00 15 03 06 04, the Notification packet indicates that an administrator resets a connection.

TABLE 5

| Error Code | Meaning | Error SubCode | Meaning |
| --- | --- | --- | --- |
| 1 | Packet header error | 1 | Unsynchronized connection |
|  |  | 2 | Incorrect packet length |
|  |  | 3 | Incorrect packet type |
| 2 | OPEN packet error | 1 | Unsupported version |
|  |  | 2 | Neighbor AS error |
|  |  | 3 | Incorrect BGP router-id |
|  |  | 4 | Unsupported optional parameter |
|  |  | 6 | Unacceptable HoldTime |
| 3 | UPDATE packet error | 1 | Malformed attribute list |
|  |  | 2 | Unrecognizable well-known attribute |
|  |  | 3 | Lacking a well-known mandatory attribute |
|  |  | 4 | Attribute flag error |
|  |  | 5 | Attribute length error |
|  |  | 6 | Invalid origin attribute |
|  |  | 8 | Invalid next hop attribute |
|  |  | 9 | Optional attribute error |
|  |  | 10 | Invalid network area |
|  |  | 11 | Malformed ASPATH |
| 4 | Expired Hold timer | 0 | Expired Hold timer |
| 5 | State machine error | 0 | State machine error |
| 6 | End | 1 | A route prefix exceeds a limit. |
|  |  | 2 | Closed by an administrator |
|  |  | 3 | Reconfigured by a neighbor |
|  |  | 4 | The administrator resets a connection. |
|  |  | 5 | Connection rejected |
|  |  | 6 | Another configuration changes. |
|  |  | 7 | Connection conflict |
|  |  | 8 | Insufficient resource |
|  |  | 9 | BFD notifies the neighbor to disconnect. |

Figure 5:
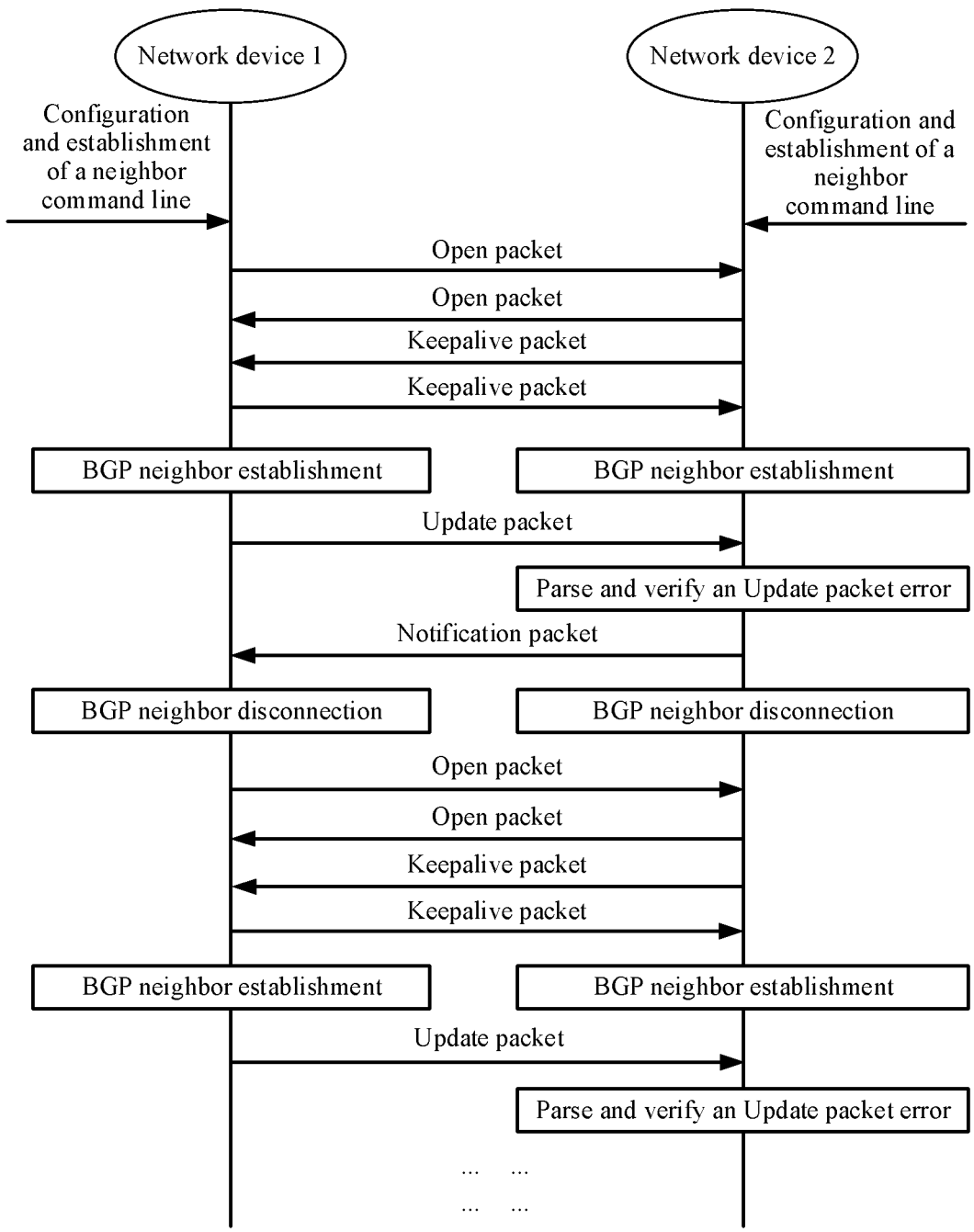
FIG. 5 is a schematic diagram of communication flapping between network devices.

FIG. 5 is a schematic diagram of communication flapping between network devices in a related technology. It can be learned that network communication is performed between a network device 1 and a network device 2. First, a BGP neighbor relationship is established between the network device 1 and the network device 2 by using an Open packet and a Keepalive packet. According to a definition in Y. Rekhter, et al., "A Border Gateway Protocol 4 (BGP-4)," Request for Comments (RFC) 4271, January 2006, when the network device 1 sends an Update packet to the network device 2, after receiving the Update packet and verifying an Update packet error, the network device 2 sends a Notification packet carrying error information to the network device 1. In addition, after sending the Notification packet, the network device 2 disconnects a BGP connection to the network device 1. After receiving the Notification packet, the network device 1 also disconnects the BGP connection to the network device 2.

However, after the disconnection, the network device 1 reconnects to a timer, and reestablishes a connection to the network device 2 after waiting time expires. After a BGP connection is established between the network device 1 and the network device 2, the network device 1 continues to send an incorrect Update packet. As a result, the BGP connection between network device 1 and network device 2 is disconnected again. Therefore, the connection between the network device 1 and the network device 2 is repeatedly established and then disconnected. This causes repeated BGP flapping.

To resolve the foregoing technical problem of repeated BGP neighbor flapping, the present disclosure provides a packet advertisement method to reduce network communication flapping self-healing. By avoiding sending an incorrect BGP Update packet, a correct packet can be transmitted between the network device 1 and the network device 2 after a connection is reestablished, so that a problem that the BGP connection is repeatedly disconnected and then repeatedly established between the network device 1 and the network device 2 is avoided, and network flapping is avoided.

Figure 6:
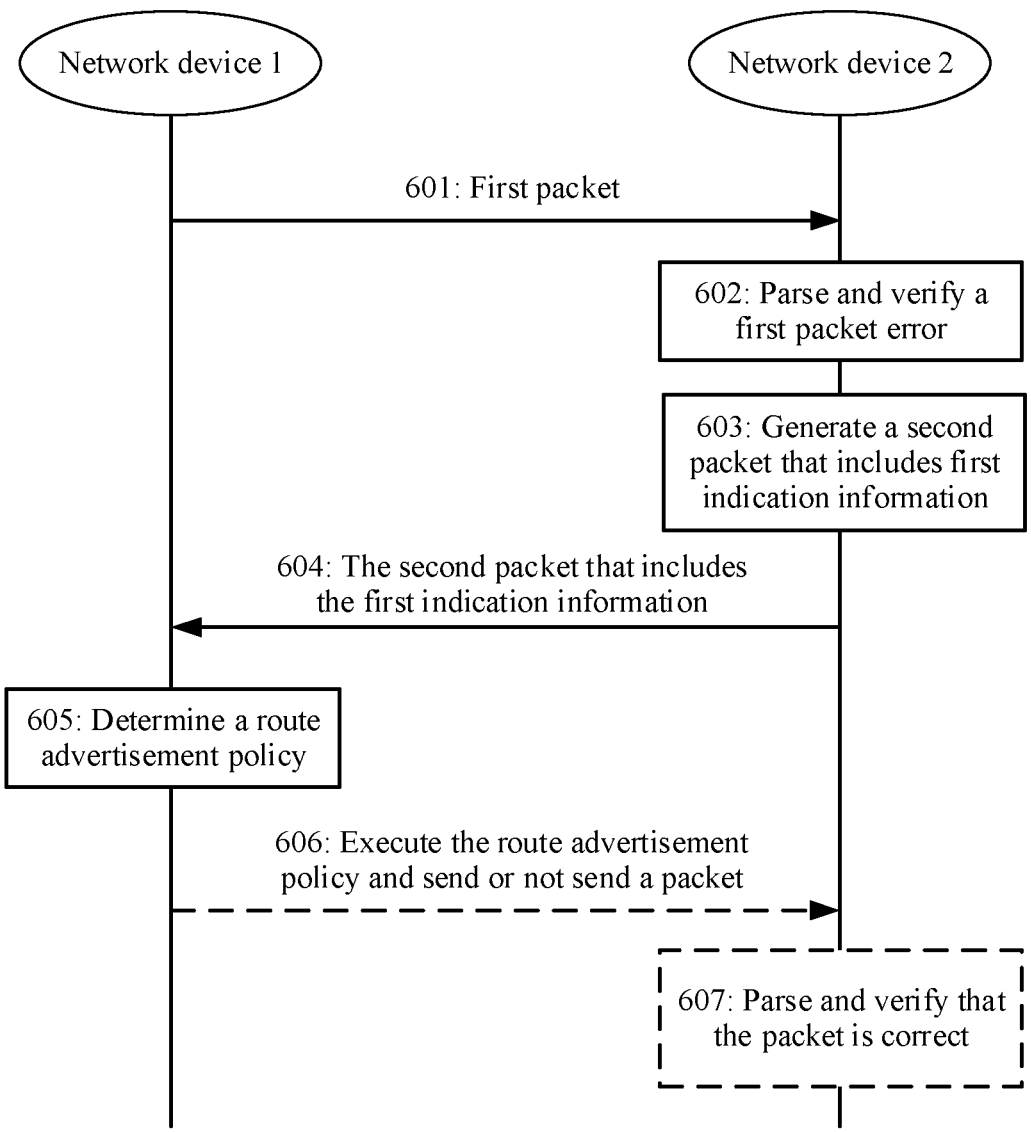
FIG. 6 is a schematic flowchart of a packet advertisement method according to an embodiment of the present disclosure.

FIG. 6 is a schematic flowchart of a packet advertisement method according to an embodiment of the present disclosure. The packet advertisement method includes the following steps.

Step 601: A network device 1 sends a first packet to a network device 2.

In this embodiment of the present disclosure, the network device 1 and the network device 2 may be physical devices, for example, a router and a switch, or may be virtual devices that support a routing function, or the like. A specific type of the network device is not limited in this embodiment of the present disclosure. The network device 1 may be a BGP neighbor of the network device 2.

For example, the first packet may be an Update packet. A format and content of the Update packet are similar to those in the foregoing descriptions corresponding to FIG. 3, and details are not described herein again.

The network device 1 may use the first packet to advertise a route to the network device 2. In other words, the first packet may include one or more route prefix information and the like.

The first packet includes a first feature, where the first feature includes the one or more route prefix information, or the first feature includes one or more attributes.

Step 602: The network device 2 parses and verifies a first packet error.

For example, the network device 2 may verify the first packet according to the BGP protocol. If the first packet does not comply with specifications of the BGP protocol, the network device 2 may obtain a result of the first packet error through verifying.

In this embodiment of the present disclosure, that a second network device verifies the first packet error includes one or more of the following cases:

1. A format of the first packet or content carried in the first packet does not comply with content specified in the BGP protocol standard. A reason for this case may be as follows. 1. The network device 1 may generate a first packet that does not comply with the protocol due to a network configuration error. In an example, the first packet is an Update packet, and the Update packet lacks a well-known mandatory attribute. In this case, the network device 2 can obtain a verification result of the first packet error.

2. The network device 2 cannot process or identify some information in the first packet. 3. The first packet error may be any one of errors corresponding to the error codes and error subcodes in Table 6.

In actual application, another error may occur in the first packet. An error case of the first packet is not specifically limited in this embodiment of the present disclosure.

Step 603: The network device 2 generates a second packet that includes first indication information.

For example, the second packet may be a Notification packet, and an error code field of the Notification packet may carry the first indication information. In actual application, the second packet may alternatively be a packet of another type. A type of the second packet is not limited in this embodiment of the present disclosure. When the second packet is the Notification packet, the error code field in the Notification packet may carry the first indication information.

The first indication information is used to indicate the first packet error.

In an example, the first indication information is carried in an error code field of a Notification packet, and a meaning of the first indication information may be shown in Table 6.

TABLE 6

| Error code | Meaning |
|---|---|
| 7 | Indicates that an error occurs in the first packet, and that an agreed attribute is not carried during next advertisement. |

TABLE 6-continued

| Error code | Meaning |
|---|---|
| 8 | Indicates that an error occurs in the first packet, and that a first feature is not carried during next advertisement. |

There may be an agreement between the network device 1 and the network device 2 on an attribute to be carried or not to be carried.

Alternatively, the second packet further includes a first feature, where the first feature includes a specific attribute and/or a specified route prefix.

In another example, the Notification packet includes an error code field, an error subcode field, and a data field. The error code field may carry the first indication information, the error subcode field may carry second indication information, and the data field may carry a first feature.

A manner in which the Notification packet carries the first indication information, the second indication information, and the first feature may be shown in Table 7.

TABLE 7

| Error code | Meaning | Error subcode | Meaning |
|---|---|---|---|
| 9 | An error occurs in the first packet. | 1 | Indicates that a route corresponding to a first route prefix is not advertised. |
| | | 2 | Indicates that a specified attribute is not carried when a second route prefix is advertised. |
| | | 3 | Indicates that a specified attribute is not carried when a route advertisement packet is sent. |

As shown in Table 7, the error subcode in the Notification packet in this embodiment of the present disclosure may be 1, 2, and 3, which respectively represent different meanings. Three cases are described respectively below:

1. If an error code in the Notification packet is 7 and an error subcode is 1, the first indication information indicates that an error occurs in the first packet, and the second indication information indicates that a route advertisement policy is a route corresponding to a first route prefix is not advertised. The data field in the Notification packet further carries the first route prefix. The error code and the error subcode may indicate the network device 1 not to advertise, according to the route advertisement policy, the route corresponding to the first route prefix. For example, if a route prefix in the data field is 1.1.1.1/30, the route advertisement policy includes a route whose route prefix is 1.1.1.1/30 is not advertised.

2. If an error code in the Notification packet is 7 and an error subcode is 2, the first indication information indicates that an error occurs in the first packet, and the second indication information indicates that a route advertisement policy is a specified attribute is not carried when a second route prefix is advertised. The error code and the error subcode may indicate the network device 1 not to include, according to the route advertisement policy, the specified attribute when advertising the second route prefix. A data field of the second packet further includes the second route prefix and the specified attribute. For example, if a route prefix in the data field is 1.1.1.1/30, and a specified attribute is an attribute A, the route advertisement policy may be: The attribute A is not carried when 1.1.1.1/30 is advertised. In an example, the second packet enables the network device 1 to delete the attribute A (if a packet includes the attribute A) from a route advertisement packet when advertising 1.1.1.1/30, and then send a route advertisement packet after the attribute A is deleted.

3. If an error code in the Notification packet is 7 and an error subcode is 3, the first indication information indicates that an error occurs in the first packet, and the second indication information indicates that a route advertisement policy is a specified attribute is not carried when a route advertisement packet is sent. The error code and the error subcode may indicate the network device 1 not to include, according to the route advertisement policy, the specified attribute when sending the route advertisement packet. A data field of the second packet may further include the specified attribute. For example, a specified attribute in the data field is an attribute B. After receiving the second packet from the network device 2, a route advertisement policy determined by the network device 1 may be: The attribute B is not carried during route advertisement.

Table 7 is merely an example provided in this embodiment of the present disclosure. In actual application, first indication information represented by an error code and second indication information represented by an error subcode may have other meanings. An administrator may set corresponding first indication information and corresponding second indication information based on an actual situation.

Step 604: The network device 1 receives the second packet from the network device 2.

In this embodiment of the present disclosure, after generating the second packet that includes the first indication information, the network device 2 sends the second packet to the network device 1. In this case, the network device 1 may receive the second packet and parse the second packet to obtain information in the second packet. For example, the network device 1 may obtain the first indication information, the second indication information, and the like in the second packet.

Step 605: The network device 1 determines a route advertisement policy.

In some embodiments, the network device 1 and the network device 2 may pre-agree upon a route advertisement policy. In this case, after receiving the first indication information in the second packet, the network device 1 may perform adjustment according to the pre-agreed route advertisement policy. For example, if the pre-determined route advertisement policy is that a route corresponding to a route prefix is not advertised, when an error code in a Notification packet received by the network device 1 is 8, the network device 1 may obtain a route prefix from the Notification packet according to the pre-agreed route advertisement policy, and not advertise a route corresponding to the route prefix.

In some other embodiments, the network device 1 and the network device 2 do not pre-determine a route advertisement policy, but determine a route advertisement policy by using the second indication information. For example, the second packet is a Notification packet. After receiving the Notification packet, the network device 1 determines a route advertisement policy by using an error subcode of the Notification packet. Examples of the error subcode and the route advertisement policy are similar to the foregoing descriptions corresponding to Table 7, and details are not described herein again.

A first feature obtained when the network device 1 determines the route advertisement policy may be obtained from the second packet (for example, the Notification packet), may be pre-agreed upon by the network device 1 and the network device 2, or may be specified by an administrator. For example, the network device 1 and the network device 2 may pre-determine a specified attribute by using an Open packet. For example, the network device 1 and the network device 2 may pre-determine, by using an Open packet, that an attribute A is a specified attribute. In this case, when the network device 2 detects the first packet error, and generates and replies with the second packet, the second packet may not carry the attribute A, because the specified attribute has been predetermined.

Step 606: The network device 1 executes the route advertisement policy.

In this embodiment of the present disclosure, the network device 1 may send a packet or not send a packet according to the determined route advertisement policy. The following analyzes two cases in which the network device 1 does not send a packet and sends a packet.

1. The network device 1 executes the route advertisement policy, and no longer advertises the route corresponding to the route prefix (where, the route corresponding to the route prefix is filtered out). In this case, the network device 1 no longer sends the incorrect first packet, so that a technical problem of repeated reconnection between the network device 1 and the network device 2 caused by repeated sending of the first packet is avoided.

2. A packet sent by the network device 1 after the network device 1 executes the route advertisement policy does not carry the first feature. The first feature is usually an attribute or information that cannot be processed or identified by the network device 2. Therefore, the network device 1 no longer sends a packet that includes the first feature that cannot be processed by the network device 2. Therefore, the network device 2 no longer encounters a verification error due to a same case, so that a technical problem of repeated reconnection between the network device 1 and the network device 2 is avoided.

Step 607: The network device 2 parses and verifies that the packet is correct.

As described in step 606, after executing the route advertisement policy, the network device 1 does not send an incorrect packet or sends a correct packet. Therefore, after receiving the packet, the network device 2 verifies that the packet is correct. It may be understood that, in some embodiments, if the network device 1 does not send an incorrect packet, the network device 2 does not receive the packet, and does not perform step 607. In other words, step 607 is an optional step.

In an embodiment corresponding to FIG. 6, a network device 1 and a network device 2 do not need to be disconnected and reconnected to each other, but the network device 1 determines a route advertisement policy based on first indication information in a second packet, so that the network device 1 no longer sends an incorrect packet, and communication between the network device 1 and the network device 2 recovers. In some other embodiments, after receiving a second packet, a network device 1 determines that the network device 1 sends an incorrect first packet. Therefore, the network device 1 may disconnect a BGP session connection to a network device 2, and then reestablish a BGP session connection to the network device 2. After reestablishing the BGP session connection to the network device 2, the network device 1 may execute a determined route advertisement policy. Therefore, the network device 1 can no longer send an incorrect first packet, and communication between the network device 1 and the network device 2 recovers.

In embodiments of the present disclosure, the network device 1 may determine the route advertisement policy immediately after receiving the second packet, may determine the route advertisement policy after the BGP session connection between the network device 1 and a network device 2 is disconnected, or may determine the route advertisement policy after the BGP session connection is reestablished. That is, the network device 1 may determine the route advertisement policy at any moment before executing the route advertisement policy. This is not limited in this embodiment of the present disclosure.

In embodiments of the present disclosure, the network device 1 avoids, according to the determined route advertisement policy, repeatedly sending an incorrect first packet, so that a technical problem of repeated flapping after the network device 1 and the network device 2 are disconnected and reconnected is avoided. In the foregoing embodiments, both the network device 1 and the network device 2 can perform the steps described in the foregoing embodiments. In some cases, if a network device generally cannot perform the steps in the foregoing embodiments, in embodiments of the present disclosure, a command line may be configured for the network device, so that the network device can perform the steps described in the foregoing methods. For example, an administrator may configure a first-type command for the network device, so that the network device can perform the steps performed by the network device 1 in the foregoing embodiments. This may also be referred to as configuring a first-type command line for the network device, so that the network device has a route filtering enhancement capability at a transmitting end. For example, an administrator may configure a second-type command for the network device, so that the network device can perform the steps performed by the network device 2 in the foregoing embodiments. This may also be referred to as configuring a second-type command line for the network device, so that the network device has a route filtering enhancement capability at a receiving end. For example, an administrator may alternatively configure both a first-type command line and a second-type command line for the network device, so that the network device has both a route filtering enhancement capability at a transmitting end and a route filtering enhancement capability at a receiving end.

The foregoing manner of enabling the network device to have a route filtering enhancement capability at a transmitting end and/or a route filtering enhancement capability at a receiving end is configuring a command line. In actual application, there may be another manner to enable the network device to have a route filtering enhancement capability at a transmitting end and/or a route filtering enhancement capability at a receiving end, for example, replacing a chip. This is not limited in this embodiment of the present disclosure.

The foregoing manner of configuring a command line is that an administrator inputs a command line to the network device, so that the network device has a route filtering enhancement capability at a transmitting end and/or a route filtering enhancement capability at a receiving end. In some other embodiments, the network device may be connected to a server. The server may deliver a command line to the network device, so that the network device can configure the command line, to implement online upgrade, and enable the network device to have a route filtering enhancement capability at a transmitting end and/or a route filtering enhancement capability at a receiving end. In actual application, there are still many manners of configuring a command line. This is not limited in this embodiment of the present disclosure.

In an actual application, when starting to communicate with another network device (for example, a network device 2), a network device 1 may not know whether the network device 2 has a route filtering enhancement capability at a receiving end, and the network device 2 also does not know whether the network device 1 has a route filtering enhancement capability at a transmitting end. Therefore, the network device 1 may send a first connection packet to the network device 2, where the first connection packet includes capability indication information that indicates that the network device 1 supports a route filtering enhancement capability. The network device 2 may also send a second connection packet to the network device 1, where the second connection packet includes capability indication information that indicates that the network device 2 supports a route filtering enhancement capability, as shown in FIG. 7.

Figure 7:
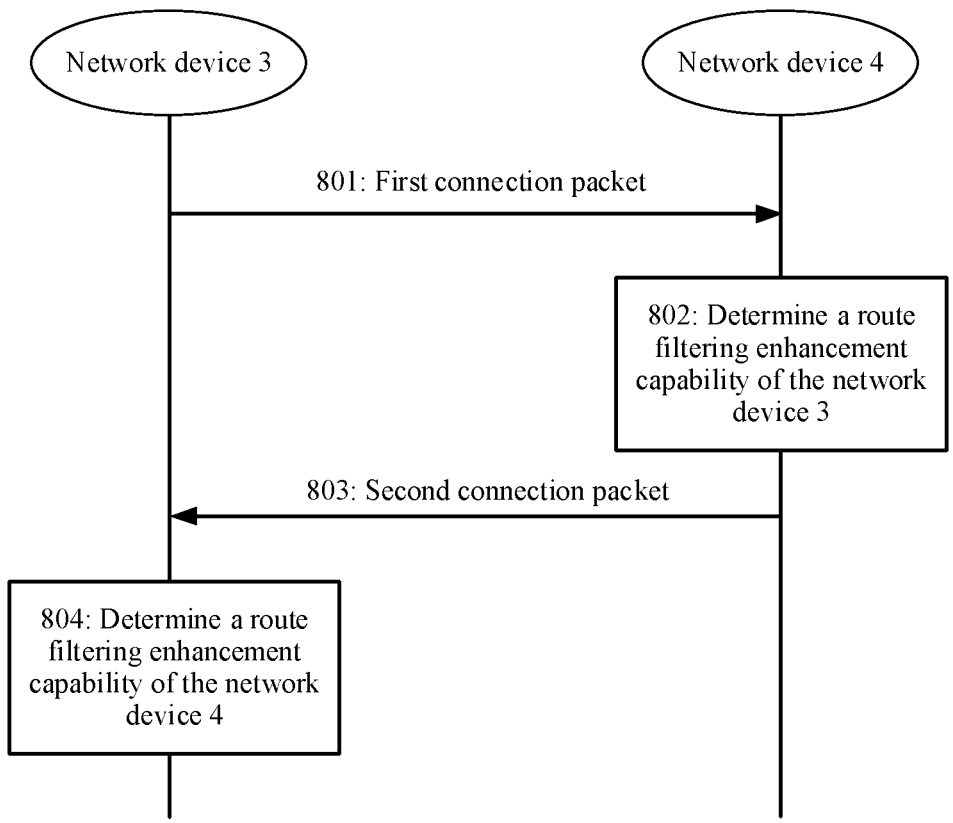
FIG. 7 is a schematic flowchart of a method for negotiating a capability between network devices according to an embodiment of the present disclosure.

FIG. 7 is a schematic flowchart of a method for negotiating a route filtering enhancement capability between network devices according to an embodiment of the present disclosure. The negotiation includes the following steps.

Step 801: A network device 3 sends a first connection packet to a network device 4.

In this embodiment of the present disclosure, the first connection packet includes capability indication information, and the capability indication information indicates that the network device 3 supports a route filtering enhancement capability. In this embodiment of the present disclosure, the route filtering enhancement capability may include at least the following three cases: 1. having a route filtering enhancement capability at a transmitting end, to be specific, having a capability of sending the packet that carries the first indication information in the embodiment shown in FIG. 6; 2. having a route filtering enhancement capability at a receiving end, to be specific, having a capability of receiving the packet that carries the first indication information in the method embodiment shown in FIG. 6, and a capability of determining a route advertisement policy based on the first indication information. 3. having both a route filtering enhancement capability at a transmitting end and a route filtering enhancement capability at a receiving end, in other words, both having the first and second capabilities. Therefore, in this embodiment of the present disclosure, the capability indication information may also have three types of information respectively indicating the three types of route filtering enhancement capabilities. For example, the first connection packet is specifically an Open packet, and an optional parameter field in the Open packet may carry capability indication information. Table 8 shows an example of optional parameter fields and meanings of the optional parameter fields in this embodiment of the present disclosure.

TABLE 8

| Field | Length | Value |
|---|---|---|
| Type | 1-byte unsigned integer | 8D |
| Length | 1-byte unsigned integer | 01 |
| Value | 1-byte unsigned integer | 01 indicates having a route filtering enhancement capability at a transmitting end. 02 indicates having a route filtering enhancement capability at a transmitting end. |

TABLE 8-continued

| Field | Length | Value |
|---|---|---|
| | | 03 indicates both having a route filtering enhancement capability at a transmitting end and a route filtering enhancement capability at a receiving end. |

It can be learned from Table 8 that, in the optional parameter field of the Open packet, parameters such as TLV may be used to represent the capability indication information, and different capabilities are distinguished by using values of different parameters. For example, 01 in the Value represents that a network device that sends the Open packet has a route filtering enhancement capability at a transmitting end. In some embodiments, a value of the Value may alternatively be 04, representing that the network device that sends the Open packet has neither a route filtering enhancement capability at a transmitting end nor a route filtering enhancement capability at a receiving end. In some cases, if an optional parameter field in the first connection packet from the network device does not have a value in Table 8, it indicates that the network device has neither a route filtering enhancement capability at a transmitting end nor a route filtering enhancement capability at a receiving end.

Table 9 is a packet example of the first connection packet.

TABLE 9

| Example | Type | Len | Value |
|---|---|---|---|
| 8D 01 01 | 8D | 01 | 01 |
| 8D 01 03 | 8D | 01 | 03 |

If an optional parameter field in an Open packet from the network device 3 is 8D 01 01, it indicates that the network device 3 has a route filtering enhancement capability at a transmitting end. For example, if an optional parameter field in an Open packet from the network device 3 is 8D 01 03, it indicates that the network device 3 has both a route filtering enhancement capability at a transmitting end and a route filtering enhancement capability at a receiving end.

In actual application, the first connection packet may alternatively be a packet of another type. A specific type of a packet to be used may be determined based on an actual situation. This is not limited in this embodiment of the present disclosure.

Step 802: The network device 4 determines the route filtering enhancement capability of the network device 3.

The network device 4 determines the route filtering enhancement capability of the network device 3 based on the first connection packet from the network device 3. That the network device 3 and the network device 4 each have a route filtering enhancement capability includes at least the following cases:

1. When the network device 4 determines that the network device 3 has a route filtering enhancement capability at a transmitting end and the network device 4 has a route filtering enhancement capability at a receiving end, the network device 4 may perform the steps performed by the network device 2 in embodiments corresponding to FIG. 6, and the network device 3 may perform the steps performed by the network device 1 in embodiments corresponding to FIG. 6.

2. When the network device 4 determines that the network device 3 has a route filtering enhancement capability at a receiving end, and the network device 4 has a route filtering enhancement capability at a transmitting end, the network device 4 may perform the steps performed by the network device 1 in embodiments corresponding to FIG. 6, and the network device 3 may perform the steps performed by the network device 2 in embodiments corresponding to FIG. 6.

3. When the network device 4 determines that the network device 3 has both a route filtering enhancement capability at a transmitting end and a route filtering enhancement capability at a receiving end, the network device 4 may perform, based on a route filtering enhancement capability of the network device 4, the steps performed by the network device 1 or the network device 2 in embodiments corresponding to FIG. 6, and the network device 3 may perform the steps performed by the network device 1 or the network device 2 in embodiments corresponding to FIG. 6.

Step 803: The network device 4 sends a second connection packet to the network device 3.

In this embodiment of the present disclosure, the second connection packet is similar to the first connection packet, and details are not described herein again.

In this embodiment of the present disclosure, after determining the route filtering enhancement capability of the network device 3, the network device 4 may return the second connection packet to the network device 3, so that the network device 3 can determine a route filtering enhancement capability of the network device 4. In some cases, the network device 4 may alternatively not return the second connection packet. This is not limited in this embodiment of the present disclosure.

Step 804: The network device 3 determines the route filtering enhancement capability of the network device 4.

In this embodiment of the present disclosure, the network device 3 may determine the route filtering enhancement capability of the network device 4 based on the received second connection packet, and determine, based on the route filtering enhancement capability of the network device 4 and the route filtering enhancement capability of the network device 3, whether to perform the steps performed by the network device 1 or the network device 2 in embodiments corresponding to FIG. 6. This is similar to the descriptions of step 803, and details are not described herein again.

Steps of performing step 801 and step 803 are not limited. For example, the network device 4 may send the second connection packet before or after receiving the first connection packet from the network device 3.

In this embodiment of the present disclosure, the network device 3 and the network device 4 may negotiate with each other to determine whether the two parties have a route filtering enhancement capability, and determine, based on a negotiation result, whether to perform the steps performed by the network device 1 or the network device 2 in embodiments corresponding to FIG. 6. This avoids an error that may occur when one of the network devices does not have the route filtering enhancement capability, and improves coordination between the network devices.

Figure 8:
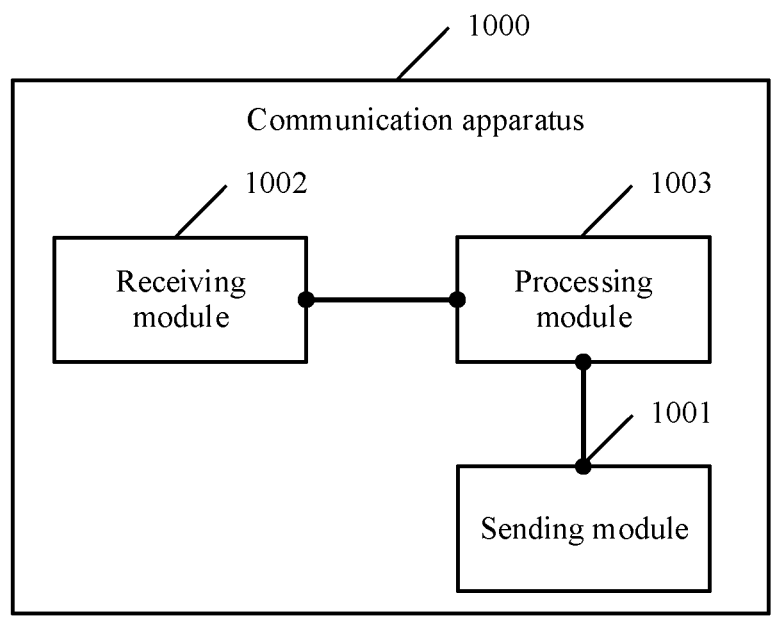
FIG. 8 is a schematic diagram of a first communication apparatus according to an embodiment of the present disclosure.

FIG. 8 is a schematic diagram of a first communication apparatus according to an embodiment of the present disclosure. The communication apparatus 1000 includes a sending module 1001, a receiving module 1002, and a processing module 1003. The communication apparatus 1000 may be the network device 1 in the method embodiment shown in FIG. 6 or the network device 3 in the method embodiment shown in FIG. 7.

The sending module 1001 may be configured to perform step 601 or another related step in embodiments corresponding to FIG. 6, or perform step 801 in the method embodiment shown in FIG. 7.

The receiving module 1002 may be configured to perform step 604 in the method embodiment shown in FIG. 6, or perform step 803 in the method embodiment shown in FIG. 7.

The processing module 1003 may be configured to perform step 605 in the method embodiment shown in FIG. 6, or perform step 804 in the method embodiment shown in FIG. 7.

It should be understood that the first communication apparatus corresponds to the network device in the foregoing method embodiments. The units in the communication apparatus 1000 and the foregoing other operations and/or functions are separately used to implement the steps and methods implemented by the network device 1 in the method shown in FIG. 6 or the network device 3 or the network device 4 in the method shown in FIG. 7. For specific details, refer to the foregoing method embodiments. For brevity, details are not described herein again.

Figure 9:
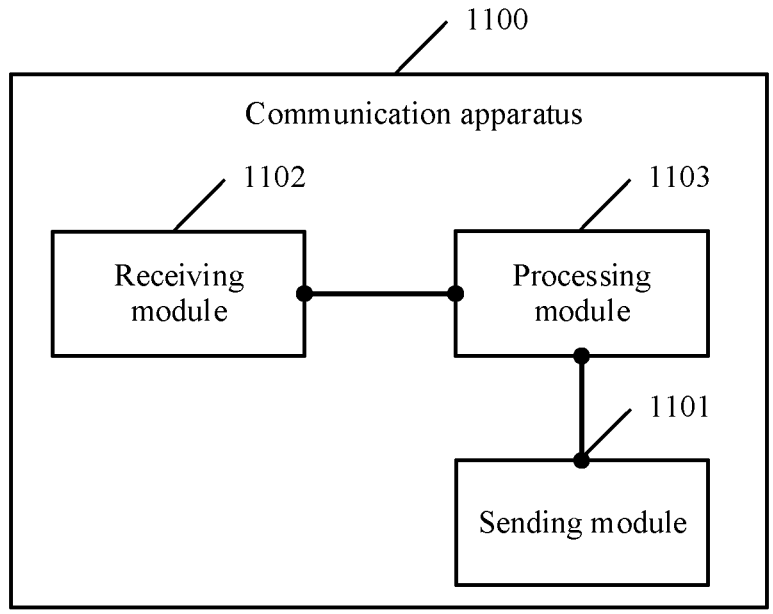
FIG. 9 is a schematic diagram of a second communication apparatus according to an embodiment of the present disclosure.

FIG. 9 is a schematic diagram of a second communication apparatus according to an embodiment of the present disclosure. The communication apparatus 1100 includes a sending module 1101, a receiving module 1102, and a processing module 1103. The communication apparatus 1100 may be the network device 2 in the method embodiment shown in FIG. 6 or the network device 4 in the method embodiment.

The sending module 1101 may be configured to perform step 604 in the method embodiment shown in FIG. 6, or perform step 803 in the method embodiment shown in FIG. 7.

The receiving module 1102 is configured to perform a step related to receiving the first packet in the embodiment shown in FIG. 6, or perform a step of receiving the first connection packet and another related step in the method embodiment shown in FIG. 7.

The processing module 1103 is configured to perform step 602, step 603, and step 607 in the method embodiment shown in FIG. 6, or perform step 802 in the method embodiment shown in FIG. 7.

It should be understood that the second communication apparatus corresponds to the network device in the foregoing method embodiments. The units in the communication apparatus 1100 and the foregoing other operations and/or functions are separately used to implement the steps and methods implemented by the network device 1 in the method shown in FIG. 6 or the network device 3 or the network device 4 in the method shown in FIG. 7. For specific details, refer to the foregoing method embodiments. For brevity, details are not described herein again.

Figure 10:
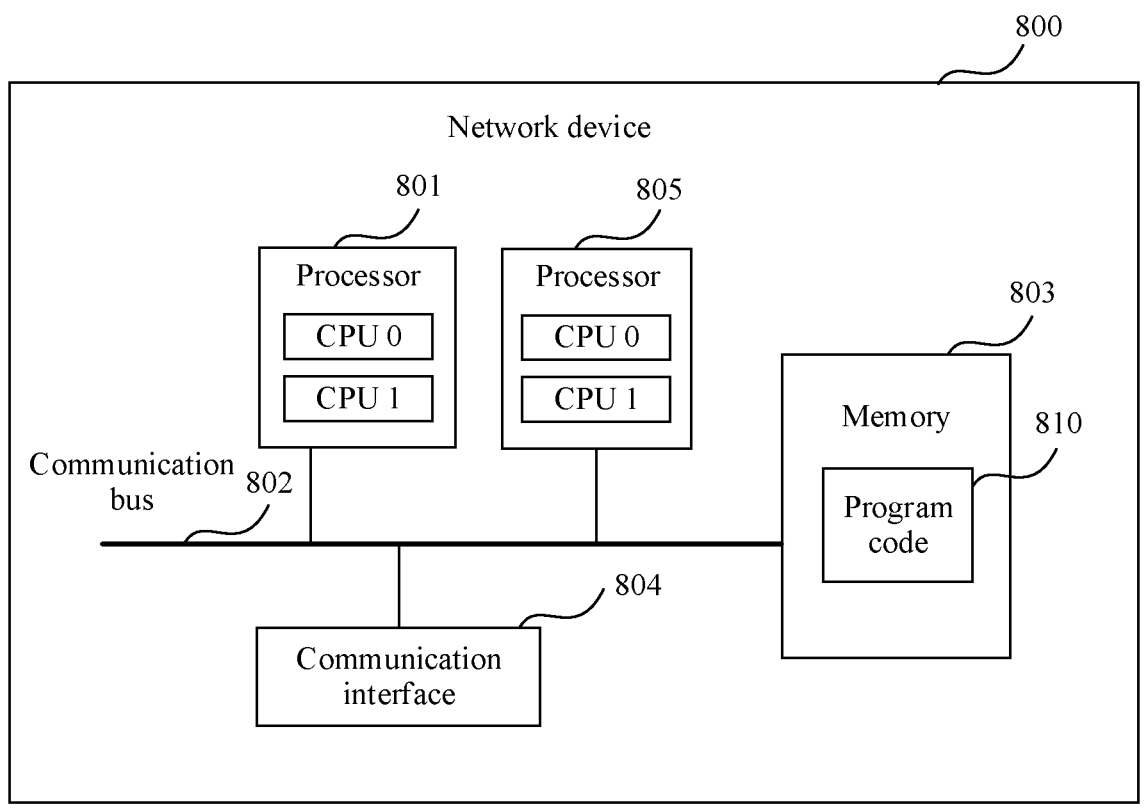
FIG. 10 is a schematic diagram of a network device according to an embodiment of the present disclosure.

FIG. 10 is a schematic diagram of a network device according to an embodiment of the present disclosure. The network device 800 includes one or more processors 801, a memory 803, and a communication interface 804. The processor 801, the memory 803, and the communication interface 804 may be connected to each other through a communication bus 802. The memory 803 is configured to store one or more programs. The one or more processors 801 are configured to run the one or more programs, so that the network device 800 performs the methods corresponding to the foregoing method embodiments. The network device 800 may be the network device 1 or the network device 2 in the method embodiment shown in FIG. 6, or the network device 3 or the network device 4 in the method embodiment shown in FIG. 7.

The processor 801 may be a general-purpose central processing unit (CPU), a network processor (NP), a microprocessor, or may be one or more integrated circuits configured to implement the solutions of the present disclosure, for example, an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The communication bus 802 is used to transmit information between the foregoing components. The communication bus 802 may be classified into an address bus, a data bus, a control bus, or the like. For ease of representation, only one thick line is for representing the bus in FIG. 10, but this does not mean that there is only one bus or only one type of bus.

The memory 803 may be a read-only memory (ROM) or another type of static storage device capable of storing static information and instructions, or may be a random-access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a Blu-ray™ optical disc, or the like), a magnetic disk storage medium or another magnetic storage device, or any other medium capable of carrying or storing expected program code in a form of instructions or a data structure and capable of being accessed by a computer. This is not limited thereto. The memory 803 may exist independently, and is connected to the processor 801 through the communication bus 802. The memory 803 may alternatively be integrated with the processor 801.

The communication interface 804 is configured to communicate with another device or a communication network by using any transceiver-type apparatus. The communication interface 804 includes a wired communication interface, or may include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 801 may include one or more CPUs, for example, a CPU 0 and a CPU 1 shown in FIG. 10.

During specific implementation, in an embodiment, the network device 800 may include a plurality of processors, for example, the processor 801 and a processor 805 shown in FIG. 10. Each of the processors may be a single-core processor (single-CPU) or may be a multi-core processor (multi-CPU). The processor herein may refer to one or more devices, circuits, and/or processing cores configured to process data (such as computer program instructions).

During specific implementation, in an embodiment, the network device 800 may further include an output device and an input device. The output device communicates with the processor 801, and may display information in a plurality of manners. For example, the output device may be a liquid-crystal display (LCD), a light-emitting diode (LED) display device, a cathode-ray tube (CRT) display device, a projector, or the like. The input device communicates with the processor 801, and may receive an input from a user in a plurality of manners. For example, the input device may be a mouse, a keyboard, a touchscreen device, or a sensor device.

In some embodiments, the memory 803 is configured to store program code 810 for executing the solutions of the present disclosure, and the processor 801 may execute the program code 810 stored in the memory 803. In other words, the network device 800 may implement, by using the processor 801 and the program code 810 in the memory 803, the packet processing method provided in the method embodiments.

The network device 800 in this embodiment of the present disclosure may correspond to a gateway device in the foregoing method embodiments. In addition, the processor 801, the communication interface 804, and the like in the network device 800 may implement the functions of the gateway device and/or the steps and the methods implemented by the gateway device in the foregoing method embodiments. For brevity, details are not described herein again.

It should be understood that the network device 800 corresponds to the network device in the foregoing method embodiments. The units in the network device 800 and the foregoing other operations and/or functions are separately used to implement the steps and methods implemented by the network device 2 in the method shown in FIG. 6 or the network device 3 or the network device 4 in the method shown in FIG. 7. For specific details, refer to the foregoing method embodiments.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in the present disclosure.

In addition, function units in embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of the present disclosure. The foregoing storage medium includes any medium that can store program code, such as a Universal Serial Bus (USB) flash drive, a removable hard disk, a ROM, a RAM, a magnetic disk, or an optical disc.

In embodiments of the present disclosure, terms such as "first" and "second" are used to distinguish same items or similar items that have basically same functions. It should be understood that there is no logical or time sequence dependency between "first" and "second", and a quantity and an execution sequence are not limited. It should be further understood that although terms such as first and second are used in the following descriptions to describe various elements, these elements should not be limited by the terms. These terms are merely used to distinguish one element from another element. For example, without departing from the scope of various examples, a first network device may be referred to as a second network device. Similarly, a second network device may be referred to as a first network device. Both the first network device and the second network device may be network devices, and in some cases, may be separate and different network devices.

The term "at least one" in the present disclosure means one or more, and the term "a plurality of" in the present disclosure means two or more. For example, a plurality of network devices means two or more network devices. Terms "system" and "network" may be used interchangeably in this specification.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer program instructions. When the computer program instructions are loaded and executed on a computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of the present disclosure, but are not intended to limit the present disclosure. Any modification, equivalent replacement, or improvement made without departing from the spirit and principle of the present disclosure shall fall within the protection scope of this application.

What is claimed is:

1. A packet advertisement method implemented by a first network device, the packet advertisement method comprising:
   sending, to a second network device, a first packet comprising a feature, wherein the feature comprises at least one of a specified attribute or a route prefix;
   receiving, from the second network device in response to the first packet, a second packet comprising an error code indicating a packet error associated with the first packet; and
   determining, based on the error code, a route advertisement policy associated with the feature, wherein the route advertisement policy resolves the packet error.

2. The packet advertisement method of claim 1, wherein the feature comprises the route prefix, and wherein the route advertisement policy specifies that a second route corresponding to the route prefix is not advertised.

3. The packet advertisement method of claim 2, wherein the second packet further comprises the route prefix.

4. The packet advertisement method of claim 1, wherein the feature comprises both the route prefix and the specified attribute, and wherein the route advertisement policy specifies that the specified attribute is not carried when the route prefix is advertised.

5. The packet advertisement method of claim 4, wherein the second packet further comprises the route prefix and the specified attribute.

6. The packet advertisement method of claim 1, wherein the feature comprises the specified attribute, and wherein the route advertisement policy specifies that the specified attribute is not carried when a route advertisement packet is sent.

7. The packet advertisement method of claim 1, wherein the first packet is a Border Gateway Protocol (BGP) Update packet.

8. The packet advertisement method of claim 1, wherein the second packet comprises a BGP Notification packet, and wherein an error code field of the second packet carries the error code.

9. The packet advertisement method of claim 8, wherein an error subcode field of the second packet comprises an error subcode indicating a subtype error corresponding to the packet error.

10. The packet advertisement method of claim 1, further comprising receiving, from the second network device, a first connection packet comprising capability indication information indicating that the second network device supports a route filtering enhancement capability.

11. A packet advertisement method implemented by a second network device, the packet advertisement method comprising:
    receiving, from a first network device, a first packet comprising a feature, wherein the feature comprises at least one of a specified attribute or a route prefix;
    identifying a packet error associated with the first packet; and
    sending, to the first network device, a second packet in response to the packet error, wherein the second packet carries an error code corresponding to the packet error for determining a route advertisement policy associated with the feature that resolves the packet error.

12. The packet advertisement method of claim 11, further comprising sending, to the first network device, a first connection packet comprising capability indication information indicating that the second network device supports a route filtering enhancement capability.

13. A first communication apparatus comprising:
    a memory configured to store instructions; and
    one or more processors coupled to the memory and configured to execute the instructions to cause the first communication apparatus to:
    send, to a second communication apparatus, a first packet comprising a feature, wherein the feature comprises at least one of a specified attribute or a route prefix;
    receive, from the second communication apparatus in response to the first packet, a second packet comprising an error code indicating a packet error associated with the first packet; and
    determine, based on the error code, a route advertisement policy associated with the feature, wherein the route advertisement policy resolves the packet error.

14. The first communication apparatus of claim 13, wherein the feature comprises the route prefix, and wherein the route advertisement policy specifies that a second route corresponding to the route prefix is not advertised.

15. The first communication apparatus of claim 14, wherein the second packet further comprises the route prefix.

16. The first communication apparatus of claim 13, wherein the feature comprises both the route prefix and the specified attribute, and wherein the route advertisement policy comprises the specified attribute is not carried when the route prefix is advertised.

17. The first communication apparatus of claim 16, wherein the second packet further comprises the route prefix and the specified attribute.

18. The first communication apparatus of claim 13, wherein the feature comprises the specified attribute, and wherein the route advertisement policy specifies that the specified attribute is not carried when a route advertisement packet is sent.

19. The first communication apparatus of claim 13, wherein the second packet is a BGP Notification packet, and wherein an error code field of the second packet carries the error code.

20. The first communication apparatus of claim 13, wherein the one or more processors are further configured to execute the instructions to cause the first communication apparatus to receive a first connection packet from the second communication apparatus, wherein the first connection packet comprises capability indication information indicating that the second communication apparatus supports a route filtering enhancement capability.

* * * * *